United States Patent [19]

Barber

[11] Patent Number: 4,818,946
[45] Date of Patent: Apr. 4, 1989

[54] METHOD AND APPARATUS FOR ENHANCING THE RESOLUTION OF AN INDUCTION LOGGING TOOL IN MEASURING A CHARACTERISTIC OF A BOREHOLE FORMATION

[75] Inventor: Thomas D. Barber, Houston, Tex.

[73] Assignee: Schlumberger Technology Corporation, Houston, Tex.

[21] Appl. No.: 100,381

[22] Filed: Sep. 24, 1987

[51] Int. Cl.[4] .............................................. G01V 3/28
[52] U.S. Cl. .................................................... 324/339
[58] Field of Search ............... 324/332, 333, 334, 336, 324/337, 338, 339, 340, 341, 342, 343; 364/422

[56] References Cited

U.S. PATENT DOCUMENTS

4,471,436  9/1984  Schaefer et al. ................... 324/339
4,513,376  4/1985  Barber ................................. 324/339

Primary Examiner—Reinhard J. Eisenzopf
Assistant Examiner—Walter E. Snow
Attorney, Agent, or Firm—Henry N. Garrana; John H. Bouchard

[57] ABSTRACT

A method and apparatus for enhancing the resolution of an induction logging tool at a desired depth of investigation comprising receiving an induction signal from the formation corresponding to the desired depth of investigation, receiving a second signal from the formation having no zeroes in the spatial frequency domain and filtering and combining the received signals to provide high frequency signal information from the second signal to augment and enhance the first signal. Additional corrections, such as for skin effect and shoulder effect are also made.

23 Claims, 4 Drawing Sheets

METHOD AND APPARATUS FOR ENHANCING THE RESOLUTION OF AN INDUCTION LOGGING TOOL IN MEASURING A CHARACTERISTIC OF A BOREHOLE FORMATION

BACKGROUND OF THE INVENTION

This invention relates to electrical induction logging systems for determining the nature and characteristics of the various sub-surface formations penetrated by a borehole in the earth. More particularly, this invention relates to a high resolution array induction sonde that provides better vertical resolution while retaining the level of depth of penetration of prior tools.

It is important to the oil and gas industry to know the nature and characteristics of the various sub-surface formations penetrated by a borehole because the mere creation of a borehole (typically by drilling) usually does not provide sufficient information concerning the existence, depth location, quantity, etc., of oil and gas trapped in the formations. Various electrical techniques have been employed in the past to determine this information about the formations. One such technique commonly used is induction logging. Induction logging measures the resistivity (or its inverse, conductivity) of the formation by first inducing eddy currents to flow in the formations in response to an AC transmitter signal, and then measuring a phase component signal in a receiver signal generated by the presence of the eddy currents. Variations in the magnitude of the eddy currents in response to variations in formation conductivity as reflected as variations in the receiver signal. Thus in general, the magnitude of a phase component of the receiver signal, that component in-phase with the transmitter signal, is indicative of the conductivity of the formation.

U.S. Pat. Nos. 3,340,464; 3,147,429; 3,179,879; 3,056,917 and 4,472,684 are illustrative of typical prior art well logging tools which utilize the basic principles of induction logging. In each of the tools disclosed in these patents, a signal generator operates to produce an AC transmitter signal which is applied to a transmitter coil. The current in the transmitter coil induces in the formations a magnetic field, which, in turn, causes eddy currents to flow in the formations. Because of the presence of these formation currents, the magnetic field of the transmitter is coupled into a receiver coil R thereby generating a receiver signal. (Logging tools having "a receiver coil" and "a transmitter coil" each comprising several coils arranged in a predetermined geometrical fashion to obtain a desired response are commonly used. These coil systems are sometimes referred to as "focused" coil systems.) The receiver signal is then generally amplified and applied to one or more phase sensitive detectors (PSDs). Each PSD detects a phase component signal having the same phase as a phase reference signal which is also applied to the detector. The phase reference signal has a predetermined phase relationship to the current in the transmitter coil(s). The output of the PSD(s) may be further processed downhole, or may be sent uphole to surface equipment for processing or display to an operating engineer. Such processing may be accomplished using many well known techniques, including phasor deconvolution processing taught by U.S. Pat. Nos. 4,513,376 issued to T. Barber on Apr. 23, 1985, and 4,471,436 issued to R. Schaefer and T. Barber on Sept. 11, 1984, both incorporated by reference.

Since the earliest patents pertaining to focussed coil systems for induction logging (U.S. Pat. Nos. 2,582,313 and 2,582,315) the art has attempted to reduce the contribution to the tool response made by that part of the formation invaded by the drilling fluid ("invaded zone") and by formations above and below the region of interest. For example, U.S. Pat. No. 3,067,383, issued to D. R. Tanguy on Dec. 4, 1962 and incorporated herein by reference, discloses a sonde (hereinafter referred to as the Tanguy sonde) that has been very widely used in the industry and U.S. Pat. No. 2,790,138 issued to A. Poupon on Apr. 23, 1957 discloses the use of a plurality of electrically independent transmitter-receiver pairs arranged symmetrically about the same center point. The response of that tool is obtained by combining the response of the several electrically independent pairs, these pairs being arranged in such a manner that contributions to the tool response from formation regions lying above or below the outermost coils and from the formation region close to the borehole are reduced. These attempts to increase vertical resolution and achieve greater depth of formation penetration have not been entirely successful.

Other patents (such as U.S. Pat. No. 3,329,889 issued to D. R. Tanguy on July 4, 1967 and U.S. Pat. No. 3,453,530 issued to G. Attali on July 1, 1969), incorporated by reference, has described induction tools that combine two or more focused arrays in one tool with the object of making measurements in radially different parts of the formation. The deep array in these tools is the deep-reading Tanguy sonde, with a derivative array having several receivers and sharing common transmitters with the deep array forming an array with a medium depth of investigation. The deep and medium arrays from these references will be referred to as ILD and ILM, respectively.

Until recently, strong deconvolution methods for induction sondes have failed in practice, because the response of an induction sonde is a nonlinear function of the formation conductivity. Any deconvolution method that does not correct for this nonlinearity will fail when applied to real log data. On the other hand, attempts to produce a strongly focussed induction array have also had problems. Unlike radar antennas, an induction sonde can be "focused" in the array only by adding coil pairs that subtract out signal from where it is not wanted, leading to very low sensitivity. Another problem with strong focussing is the length necessary to produce a narrow response lobe.

With the advent of the phasor deconvolution processing methods, noted previously, with its skin effect correction, deconvolving the nonlinear induction response function became possible. The application of phasor deconvolution to prior tools has produced deep-reading logs free of shoulder effect, but with no increase in vertical resolution. The resolution problems lie therefore, in the response function of the deep-reading tools themselves. With the present state of the art in signal processing, the only solution to these problems is to use shallower arrays whose response function contains sufficient high spatial frequency information as an addition to the deep measurement. The combination can be successfully sharpened with a deconvolution filter. The present invention provides such a combination of induction array tools and signal processing.

It is therefore an object of the invention to provide a novel method of combining measurements from shallow and deep induction arrays to produce an equivalent array capable of better vertical resolution and greater radial depth of penetration than prior tools.

A further object is to provide a novel dual induction or multiple induction tool having complementary arrays that provide various radial depths of penetration.

Other and further objects will be explained hereafter and are more particularly delineated in the appended claims.

In summary, however, from one of its broad aspects, the invention contemplates a method and apparatus for enhancing the resolution of an induction logging tool at a desired depth of investigation by transmitting an induction signal into the formation, receiving at a first receiver (array) a first induction signal from the formation corresponding to the desired depth of investigation, receiving at a second receiver (array) a second induction signal from the formation having no zeroes in the spatial frequency response in the frequency band of interest and combining the first and second received induction signals to provide a high resolution measurement of a characteristic of the formation at the desired depth of investigation. Preferred details and structures are hereinafter more particularly described.

The invention will now be described with reference to the accompanying drawings in which.

Figure 1:
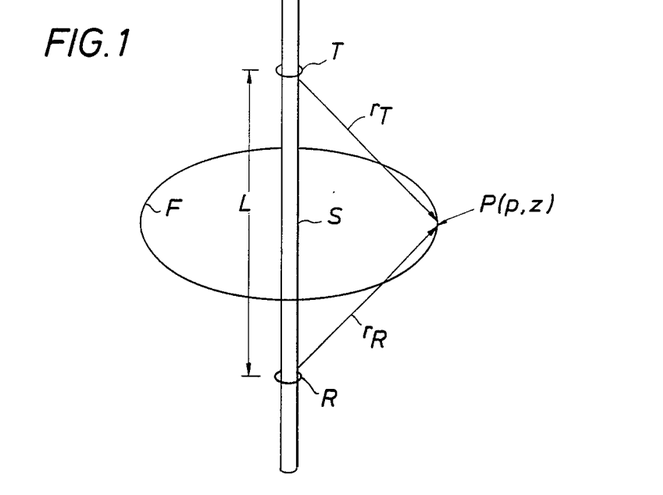
FIG. 1 shows a schematic representation of an ideal 2-coil sonde with cylindrical coordinates used to reference an arbitrary point P in the formation.

Referring now to FIG. 1, a transmitter coil T and a receiver coil R are mounted on a support member S having a transmitter-receiver spacing L for investigating a formation F. The transmitter current induces eddy currents in the formation, one loop of which is shown diagramatically as a circle at a point P having cylindrical coordinates $P(\rho,z)$ with a distance between the point P and transmitter or receiver being shown as $r_T$ or $r_R$ respectively.

The response of the induction tool to various parts of the formation is well known. Specifically, the induction signal received by the receiver coil(s) from the formation is simply the volume integral of all of the formation current density induced by the electromagentic induction signal being transmitted into the formation by the transmitter(s). For a two-coil array at the zero conductivity limit this volume integral is easily interpreted.

With the coils arranged as shown in FIG. 1, with the formation having uniform conductivity, the total voltage in the receiver coil induced by the entire formation conductivity is in the form of convolution or mapping integral:

$$V_R = K\sigma \int_{-\infty}^{\infty} \int_0^{\infty} \frac{\rho^3}{r_T^3 r_R^3} d\rho \, dz \quad (1)$$

where the integrand:

$$g(\rho,z) = \frac{\rho^3}{r_R^3 \, r_T^3} \quad (2)$$

called the geometrical factor or response function, describes the contribution to the total receiver coil voltage from the point P in the formation. The instrument constant K takes into account the size of the coils, the number of turns and spacing as is well known. For an array with more than two coils, the total response is a superposition of the possible individual coil-pair responses.

Integrating the response function $g(\rho,z)$ with respect to r gives the response of the array to the bedding layers of the earth formation, known as the vertical response function or geometrical factor $g(z)$. This will be further discussed subsequently with respect to FIG. 3.

The nature of an ideal processing method (hereinafter referring to phasor processing) used to filter the receiver signals to produce a measurement of a formation characteristic is well disclosed in U.S. Pat. No. 4,513,376. However, limits produced by the prior sonde designs, such as ILD, also limited the log that could be produced when using the phasor-processing. Such limitations include negative or skewed correlation between the resistivity log and the actual formation resistivity, especially in thin beds.

Providing a sonde such as the present sonde with a signal containing spatial frequency information more well suited to the phasor processing limits the anti-correlation of ILD in thin beds and therefore provides a sonde with better vertical resolution. Comparison of resistivity logs produced by the Tanguy and instant combination can be seen in FIGS. 11 and 12.

Figure 2:
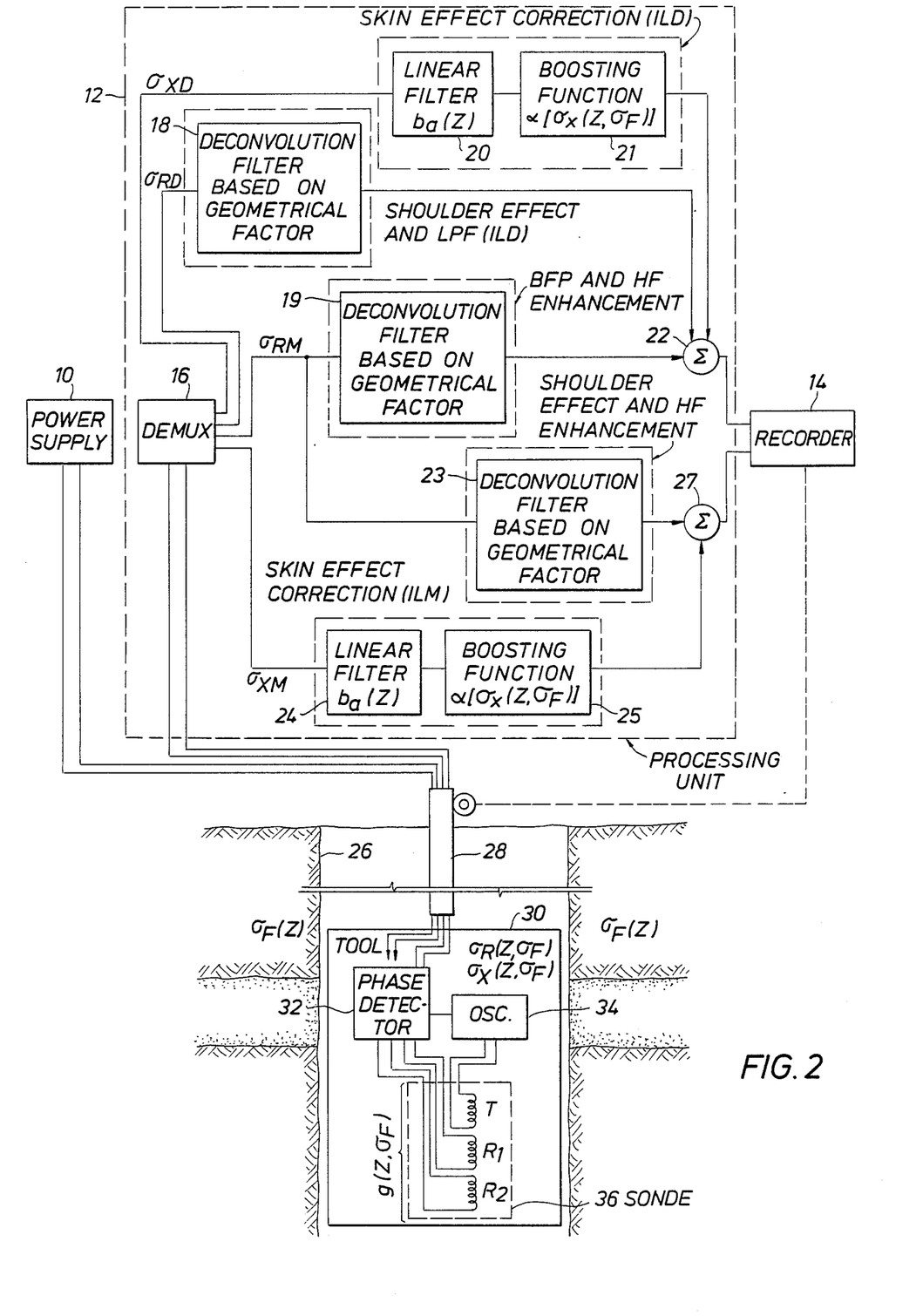
FIG. 2 is a schematic block diagram of an induction logging system of the present invention.

To provide the logs of FIGS. 11 and 12 the phasor processing is implemented generally by a processing unit as shown in FIG. 2, discussed later. The phasor processing is used on the voltage measurements obtained by the receivers of the induction logging tool or sonde. These voltage measurements are representative of the conductivity of the formation based on the well known geometrical factor theory.

Here, the function $g(\rho,z,\phi,\sigma_F)$ represents both the geometrical parts of the coupling and the propagation parts. $\sigma_M(z)$ is the receiver signal in units of conductivity at the position $\rho=0,z$. The function $g(\rho,z,\phi,\sigma_F)$ maps the formation conductivity $\sigma_F(z)$ into the measured signal $\sigma_M(z)$.

In the homogeneous medium, $g(\rho,z,\phi,\sigma_F)$ is given by $$g_{HOM} = \frac{L}{4} \frac{\rho^3}{r^3_R r^3_T} [(1 - ik r_T) e^{ik r_T} + (1 - ik r_R) e^{ik r_R}], \quad (3)$$

where L is the coil spacing, $K^2 = i\omega\mu\sigma_F$ is the propagation constant, $r_T$ is the vector distance from the transmitter coil to the formation element $(\rho,z)$ and $r_R$ is the vector distance from the receiver coil to the formation element $(\rho,z)$ (the $\phi$ dependence disappearing due to the cylindrical symmetry).

Thus the receiver signal in terms of the formation conductivity distribution for the function $g(\rho,z,\phi,\sigma_F)$ is not linear. That is, $$\int_V g a \sigma_F dV \neq a \int_V g \sigma_F dV. \quad (4)$$

However, the function g will be referred to as the induction sonde response function because it does describe the mapping of the formation conductivity distribution into the received signal at the point $\rho = 0, z$. The function g is, obviously, different at each point along the borehole.

The following derivation considers only cylindrically symmetric formation geometries so the integration over $\phi$ disappears. Since the measured signal is constrained by the borehole to be a function of z only, integration over $\rho$ obtains the vertical spatial sonde response function g(z) given as follows:

$$g(z,\sigma_F) = \int_0^\infty g(\rho,z,\sigma_F) d\rho. \quad (5)$$

The mapping function $g(z,\sigma_F)$ is a function of $\sigma_F(z)$ and is non-linear with linear changes in $\sigma_F(z)$. The following mapping operation $$\sigma_M = \int_{-\infty}^\infty g(z - z', \sigma_F) \sigma_F(z') dz', \quad (6)$$

is also not a proper convolution so the concept of a linear deconvolution is not applicable.

However, in the limit of low conductivity, Equation 2 reduces to $$g_{GF}(z) = \frac{L}{2} \frac{\rho^3}{r^3_T r^3_R}, \quad (7)$$

where $g_{GF}(z)$ is the geometrical factor of the induction sonde and is constant over all formation conductivities. The function $g_{GF}$ is not an accurate description of the induction response at higher conductivities, but the present invention uses $g_{GF}$ as the basis for the development of a deconvolution method.

The convolution of $g_{GF}(z)$ with the formation conductivity produces a "measurement," $\sigma_{GF}(z)$, given by:

$$\sigma_{GF} = \int_{-\infty}^\infty g_{GF}(z - z') \sigma_F(z') dz'. \quad (8)$$

This is what would be measured by an induction sonde if there were no skin effect, and represents a proper convolution. Equation 7, when integrated over p gives the vertical geometrical factor:

$$g_{GF}(z) = \begin{cases} \frac{1}{2L}, & |z| < \frac{L}{2}; \\ \frac{1}{\delta z^2}, & |z| > \frac{L}{2}. \end{cases} \quad (9)$$

Since the measured signal $\sigma_M(z)$ given by Equation (6) is a complex quantity, $\sigma_M(z) = \sigma_R(z) + i\sigma_X(z)$, and the sonde response function is the weighting function which describes the contribution of the conductivity of each element of the formation to the measured conductivity referred to a given depth, g(z) must also be complex. Thus, $$g(z,\sigma_F) = g_R(z,\sigma_F) + i g_X(z,\sigma_F), \quad (10)$$

where $g_R(z,\sigma_F)$ is the real component of the sonde response function and is that response function which transforms $\sigma_F$ into the in-phase R component measurements and $g_X(z,\sigma_F)$ is the imaginary component of the sonde response function which transfroms $\sigma_F$ into the quadrature phase X components. While $g(z,\sigma_F)$ (and its components, $g_R(z,\sigma_F)$ and $g_X(z,\sigma_F)$) is both a function of depth (z) and conductivity $(\sigma_F)$, hereinafter the discussion will be in reference to g(z) as a function only of depth, unless otherwise stated, while recognizing that g(z) changes as the conductivity $(\sigma_F)$ of the formation under investigation changes. Therefore g(z) will be referred to as the vertical response function, being a function of vertical depth. Where $\sigma_F$ is approximately zero, $g(z,\sigma_F)$ is real and is defined to be $g_{GF}(z)$, the geometrical factor of the induction sonde, and $\sigma_M = \sigma_R$.

The sonde response function for an induction logging tool would ideally be a delta function $\delta(z - z')$ that maps the conductivity of an infinitesimally thin sheet of formation into the measured value of $\sigma_M(z)$ at each measurement depth. The sonde response function for any realizable sonde, however, is far from ideal, and each measurement will include the contributions from a volume of formation many feet thick.

Although the sonde response function does not describe an infinitesimally thin sheet of formation, but rather includes contributions from the conductivity of formations several feet in thickness, there could possibly exist an operator h(z) which would map the sonde response function g(z) into the ideal delta function $\delta(z - z')$. Thus, an expression for $\delta(z - z')$ could be written as:

$$\delta(z) = \int_{-\infty}^\infty h(z - z') g_{GF}(z') dz'. \quad (11)$$

Equation 11 can be rewritten in the spatial frequency domain k by performing a Fourier transform of both sides of Equation 11, yielding:

$$\Delta(k) = H(k) G_{GF}(k). \quad (12)$$

Assuming that the conductivity is constant radially (non-invaded beds), in a homogenous medium, the apparent conductivity will be given by:

$$\sigma_M = \int_{-\infty}^{\infty} g_{GF}(z - z')\sigma_F(z')dz', \quad (13)$$

where $z'$ is the axial distance from the center of the sonde and $\sigma_F(z-z')$ is the true formation conductivity. Equation 13 is recognized as being of the form of the convolution integral of a linear time-invariant filter.

The Fourier transform of Equation 13 may be taken:

$$\Sigma_M(k) = G_{GF}(k)\Sigma_F(k), \quad (14)$$

where the spatial frequency, k, equals the reciprocal of distance. The article by C. F. George, et al., appearing in the February 1964 issue of Geophysics, entitled "Application of Inverse Filters to Induction Log Analysis," shows applying Fourier transforms to equations which characterize induction logging, and obtaining inverse filters to improve data processing of induction logs.

From Equation 12, if the ideal system transfer function $\Delta(k)$ is substituted for $G_{GF}(k)$ of Equation 14, the apparent conductivity $\Sigma_M(k)$ should equal the transformed true conductivity $\Sigma_F(k)$. Thus, Equation 14 becomes:

$$\Sigma_M(k) = H(k)G_{GF}(k)\Sigma_F(k). \quad (15)$$

Referring to Equation 15, if H(K) is equal to the reciprocal of $G_{GF}(k)$, the measured conductivity, $\Sigma_M(k)$, will equal the formation conductivity $\sigma_F(k)$. The problem with defining H(k) as equal to the reciprocal of $G_{GF}(k)$ is that $G_{GF}(k)$ vanishes at certain values of k, leaving H(k) indeterminate. Therefore the specific values k for which $G_{GF}(k)=0$ are sometimes referred to in the art as "blind" frequencies.

An $H_L(k)$ can be mathematically described as:

$$H_L(k) = \begin{cases} \frac{1}{G(k)}, & k \leq k_C \\ 0 & k > k_C, \end{cases} \quad (16)$$

where the frequency k is less than the first blind frequency. A target transfer function $T_L(k)$ can be defined as:

$$T_L(k) = \begin{cases} 1, & k \leq k_C \\ 0 & k > k_C. \end{cases} \quad (17)$$

In other words, $T_L(k)$ is the ideal low-pass filter curve.

The present invention avoids the inaccuracies produced by the blind frequency problem by combining the information from measurements taken by an induction logging tool. One induction measurement must be corresponding to the desired depth of investigation (shown later as ILD), having a blind frequency, and an other induction measurement (shown later as ILM) having no blind frequencies. Refering to the ILM as a first spatial frequency response and the ILD as the second spatial frequency response it is necessary to determine a filter:

$$H_1(K) = \frac{T_1(k)}{G_1(k)}, \quad (18)$$

and $$H_2(K) = \frac{T_2(k)}{G_2(k)}, \quad (19)$$

to provide a first and second enhanced spatial frequency responses. Filtering out (low pass filter) the second frequency response from the first blind frequency (the first zero frequency) a differential spatial frequency response can be formed by combining Equations 18 and 19:

$$H_\Delta(k) = \frac{T_1(k) - T_2(k)}{G_1(k)}. \quad (20)$$

Inverting (inverse Fourier transform) Equations 20 and 19 produces differential resolution filter weights $h_\Delta(z)$ and $h_2(z)$ which can be included in Equation 13 to produce the apparent conductivity in a homogenious medium at the desired (deep) depth of interest given by:

$$\sigma_M(z) = \int_{-\infty}^{\infty} h_\Delta(z - z')g_{GF_{ILM}}(z - z')\sigma(z - z')dz' + \int_{-\infty}^{\infty} h_2(z - z')g_{GF_{ILD}}(z - z')\sigma(z - z')dz'. \quad (21)$$

Figure 3:
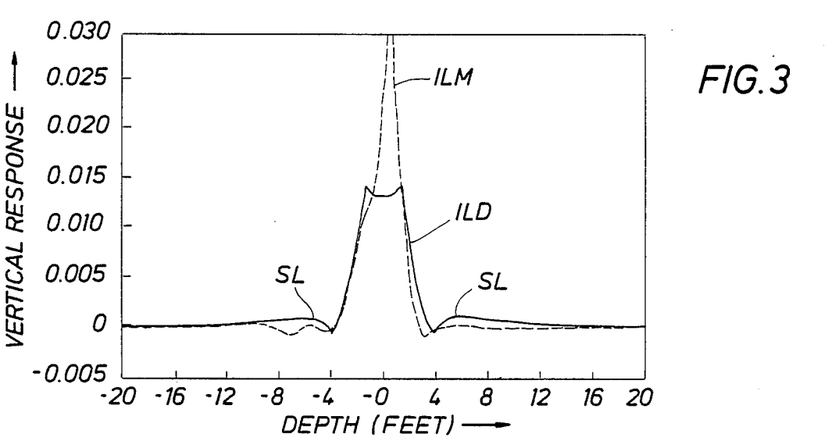
FIG. 3 shows the vertical response functions of the ILD array and the ILM array.

FIG. 3 shows the vertical response function ILD compared to the vertical response function ILM. The width of the main lobe for ILD is approximately seven feet, which corresponds to the minimum formation bed thickness that can be fully resolved. The side lobes SL are responsible for what is commonly called "shoulder effect". If, for example, the formation beds adjacent to a bed of interest are more conductive than the bed of interest, then these side lobes will introduce error into the log, and the resistivity as measured by the induction array will be too low. This can be corrected in phasor processing of induction logs to produce a response function g(z) for ILD with no side lobes. However, the phasor processing will not produce resolution in beds thinner than seven feet for ILD alone.

The reasons for not enhancing the vertical resolution (for example by providing resolution in thinner than seven foot beds) is due to the spatial frequency response of ILD. The spatial frequency response function G(k), as noted previously, is simply found by taking the Fourier transform of the vertical response function g(z), where k is in units of spatial frequency (1/length).

Figure 4:
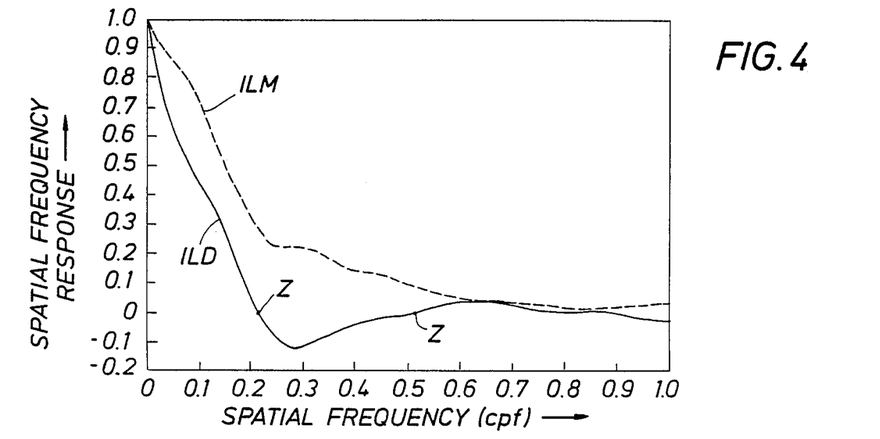
FIG. 4 shows the spatial frequency response functions of the ILD array and the ILM array.
Figure 5:
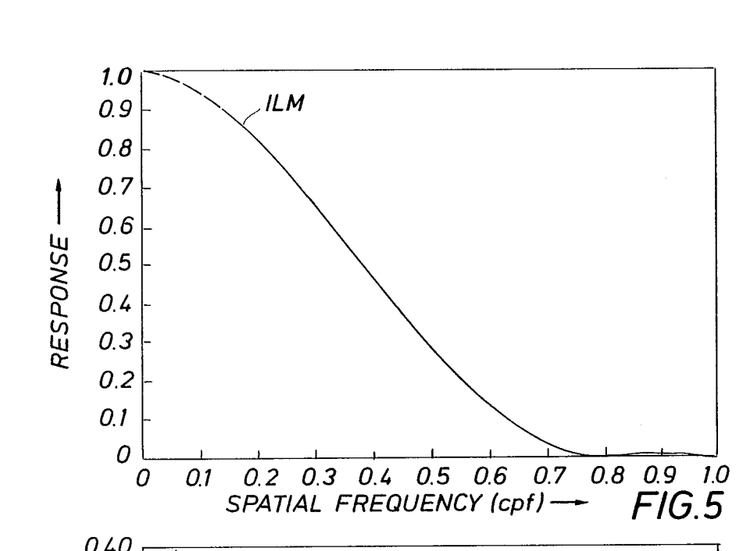
FIG. 5 shows the spatial frequency response of ILM after sharpening by deconvolution.
Figure 6:
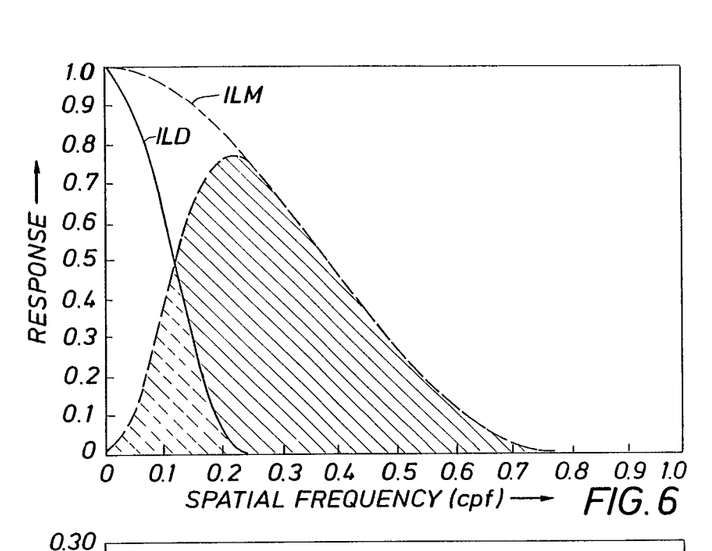
FIG. 6 shows the filter coefficients for correcting the shoulder effect of ILM.

FIG. 4 illustrates the spatial frequency response function for an ILD and a ILM arrays. The ILD response includes a first zero at approximately 0.21 cpf. The ILM response does not have a zero but decays to a small value by about 0.7 cpf. According to the method of the invention a target function for the ILM response is selected and a filter response function H(K) is determined from it, according to Equation 18. As shown in FIG. 5, $H_1(K)$ approches zero at about 0.7 cpf. Inverting $H_1(K)$ by well known inverse Fourier transform techniques results in spatial filter $h_1(z)$ illustrated in FIG. 6.

Figure 7:
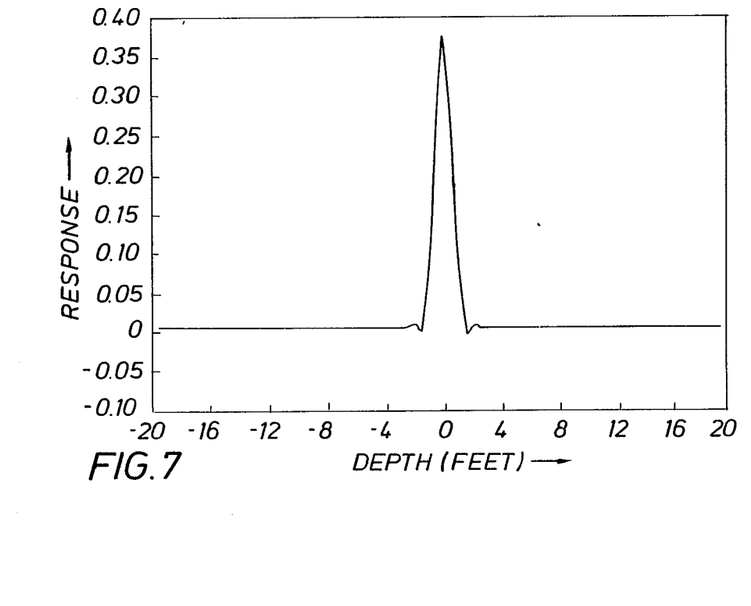
FIG. 7 shows the spatial frequency band of interest to be extracted from ILM for enhancement of ILD.
Figure 8:
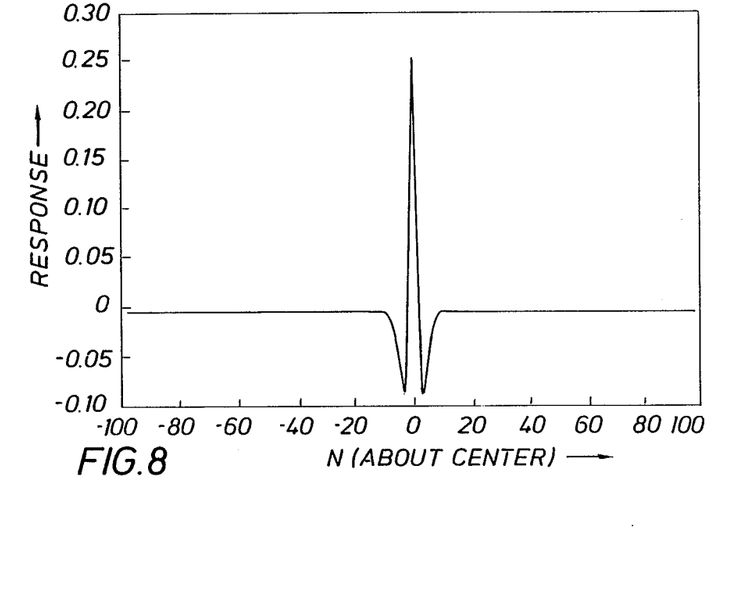
FIG. 8 shows the filter coefficients for removing the spatial frequency information from ILD.

Next, a target function for the ILD response is selected and a filter response function $H_2(K)$ is determined from it, according to Equation 19. As shown in FIG. 7, $H_2(K)$ terminates at about 0.2 cpf, this frequency of the first blind frequency for the ILD frequency response seen in FIG. 4. Inverting $H_2(K)$ by inverse Fourier transform techniques results in a spatial filter $h_2(Z)$ illustrated in FIG. 8.

Figure 9:
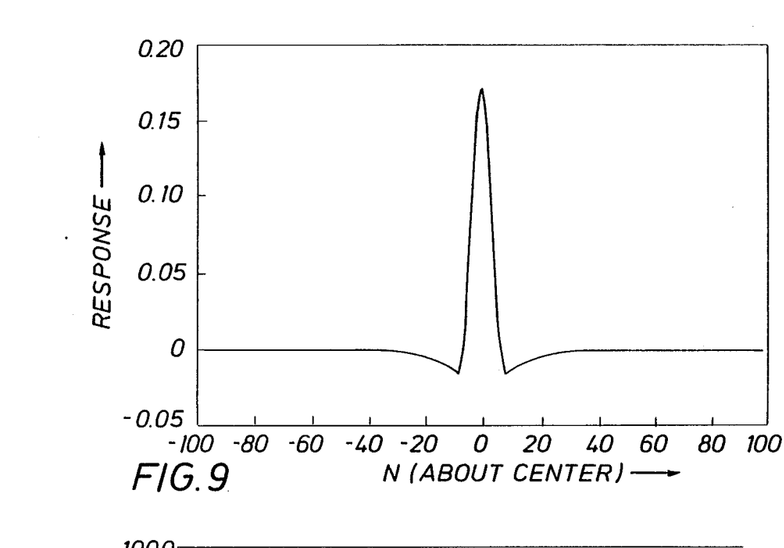
FIG. 9 shows the filter coefficients for extracting and sharpening the high spatial frequency information from ILM.

Next, the differential spatial frequency response $H_\Delta(K)$ is determined according to Equation 20. FIG. 7 illustrates $H_\Delta(K)$ as selecting only a portion of the frequency components of the ILM measurement. Inverting $H_\Delta(K)$ results in the spatial filter $h_\Delta(z)$ as illustrated in FIG. 9. According to this invention, in order to obtain an enhanced deep measurement of conductivity the measurements of ILD, $\sigma_{ILD}(z)$ are filtered or deconvolved using the filter coefficients $h_2(z)$ and added to the measurements of ILM, $\sigma_{ILM}(z)$ which have been filtered or deconvolved using the filter coefficients $h_\Delta(z)$. Of course the determination of an enhanced medium measurement of conductivity is achieved by filtering the measurements of ILM, $\sigma_{ILM}(z)$, with the filter coefficient $h_1(z)$.

Figure 10:
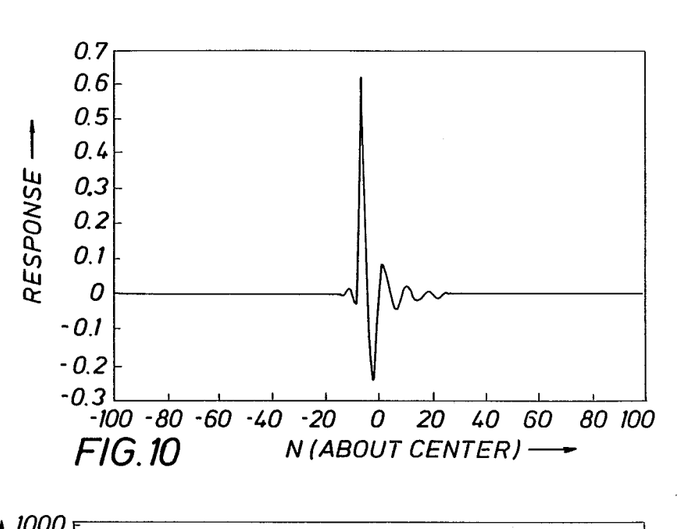
FIG. 10 shows the vertical response of ILD and ILM after enhancement.

FIG. 10 illustrates the vertical response functions which results for both the enhanced deep measurements and the medium measurement. Such vertical response function is substantially the same for both measurements, of course the deep measurement looks further radially into the formation than does the medium measurement.

Turning now to FIG. 2, which schematically illustrates the processing of $\sigma_{ILD}(z)$ measurements and $\sigma_{ILM}(z)$ measurements, an induction logging tool 30 is shown suspended in a borehole 26 by a wireline cable 28. The induction tool 30 is powered by power supply 10 and includes a sonde 36 with at least one transmitter T and at least two receiver arrays $R_1$ and $R_2$, one of which ($R_1$) has a non-zero spatial frequency response in the frequency range of interest and the other ($R_2$) providing a received signal for the desired depth of interest, (for purposes of illustration, two simple one-receiver-coil arrays are shown, however, multiple coil arrays may be used as is known in the art) having sonde response functions $g_1(z,\sigma_F)$ and $g_2(z,\sigma_F)$ which maps the formation conductivity $\sigma_F(z)$ into the log measurements $\sigma_1$ and $\sigma_2$ for each array. Tool 30 also includes phase sensitive detector 32 which responds to signals from the transmitter oscillator 34 and the received signal from the receivers $R_1$ and $R_2$ to generate the in-phase, $\sigma_R(z,\sigma_F)$, and quadrature-phase, $\sigma_X(z,\sigma_F)$, components for each log measurement.

A processing unit 12, which may be a general purpose programmed computer, for processing the induction measurements obtained by tool 30 is shown. A demux 16 separates the components of each log measurement received from tool 30. The processing method of processing unit 12 having already been explained.

In more general terms the induction tool (sonde) is a deep-reading tool because of the slow fall-off of the Em field with distance from the tool. In order to build a hard wired array which has very little sensitivity to the borehole, or which has very small side-lobes, it is necessary to cancel fields from distant parts of the formation. This necessitates many coil pairs (transmitter to receiver, or transmitter to receiver array) spread out over a long array, and the resultant sensitivity to formation conductivity is very low. In addition, the coil-pair set contains a wide range of spacings from very short to very long spacings. Since environmental effects such as conductivity-dependence (skin effect) and eccentricity with respect to the borehole are dependent on the length of the coil spacings, these effects will be very different on each different coil-pair spacing. The carefully tailored response of the hard-wired array will fall apart with environmental changes and a linear deconvolution filter could not handle these changes.

Returning to FIG. 2, consider the measurement from the array ($R_1$) with non-zero spatial frequency response (ILM). The in-phase component of the deep measurement $\sigma_{RD}$, provided by $R_2$ (ILD), is applied to filter 18. The quadrature-phase component of the deep measurement $\sigma_{XD}$ is applied to filter 20 and boosting function 21, as described in previously noted U.S. Pat. No. 4,513,376. Low-pass filter (LPF) 18 implements a filter response function h(z) based on the geometrical factor response function $g_{GF}(z)$ of the deep measurement (a deconvolution with $h_2(z)$—see Equation 19) which removes spatial frequency information above the first zero and at the same time corrects shoulder effect. The in-phase component of the medium measurement $\sigma_{RM}$, provided by $R_1$, (which has non-zero spatial frequency response) is applied to band-pass filter (BPF) 19, being a deconvolution with $h_\Delta(z)$-see Equation 20, which implements a filter response function which extracts spatial frequency information from the measurement. The BPF 19 passes spatial frequency information of the ILM in the region of 0.1–0.7 cpf (as seen in FIG. 4) where the signal drops off sharply, specifically this is to segregate the high frequency ILM information corresponding to the high frequency information necessary to match the ILM and ILD responses. The outputs of filter 18 and filter 19 are applied to linear summer 29, being an enhanced $\sigma_D(z)$ then applied with the output of boosting function 21 to linear summer 22. The output of summer 22, which represents the deep measurement, corrected for shoulder effect and skin effect, and with enhanced high spatial frequency information, is applied to recorder 14 for recording as a log.

The component $\sigma_{RM}$ is also applied to filter 23, which implements a filter function (deconvolution with $h_1(z)$—see Equation 18) to correct shoulder effect and enhance the high spatial frequency (HF) information of the medium measurement. The quadraturephase component $\sigma_{XM}$ of the medium measurement is applied to linear filter 24 and boosting function 25, as described above for 20 and 21. The outputs of filter 23 and boosting function 25 are applied to linear summer 27. The output of summer 27 represents a processed measurement with corrections for shoulder effect and skin effect. The output of summer 27 is applied to recorder 14 for recording as a log.

The summed output of filters 18 and 19 is a deconvolved deep conductivity measurement $\sigma_{DD}$, and the output of filter 23 is a deconvolved medium conductivity measurement $\sigma_{DM}$.

Figure 11:
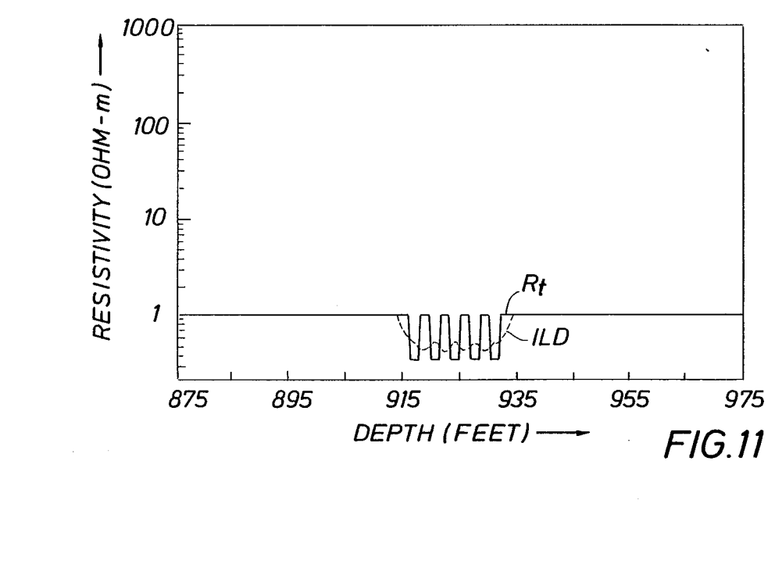
FIG. 11 shows a phasor log for the ILD array in a series of thin beds.
Figure 12:
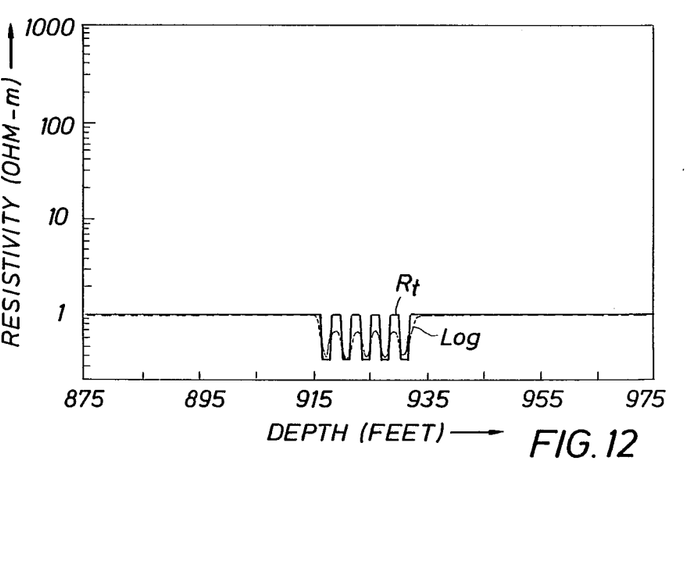
FIG. 12 shows a high resolution phasor log, similar to FIG. 11 for the combination array.

FIGS. 11 and 12 illustrate the efficacy of the method and apparatus of the invention. FIG. 11 shows the log response of an ILD resistivity (inverse of conductivity) measurement by conventional phasor processing techniques to a series of thin beds, this spatial frequency of which occures at a frequency of about 0.3 cpf. As seen, the ILD response of FIG. 11 is anti-correlated with the thin bedding pattern. FIG. 12 shows this response of the ILD measurement enhanced according to the method outlined above. The enhanced ILD response tracks the oscillatory nature of the thin bedded formation.

The main advantage of the deconvolution principle is that it can combine measurements made over a very long interval into a single measurement. Since the induction tool "looks" over such a long distance, it follows that measurements should be combined over a similar distance to obtain the best response. For instance, in the filter used in phasor processing, measurements over a total depth of 100 feet are combined to obtain the conductivity at a single borehole depth. Changes in the tool response with conductivity or other environmental effects can be handled by various mechanisms, such as the quadrature signal measurement of phasor processing, by using several filters governed by the strength of the effects, or by determining the filter weights as a function of conductivity.

The principles outlined above can be used to build a dual induction or multiple induction tool with each distinct receiver array being measured separately. One such array must have no zeroes in its spatial frequency response within the frequency range of interest. High spatial frequencyinformation from this array can be extracted with a filter and used with measurements from any array with zeroes in its spatial frequency response (or with little or no high spatial frequency information) to produce matched vertical resolution for all arrays. Additionally, alternate possibilities include an ILM signal that has one or more zeroes in the spatial frequency domain being enhanced by an ILD signal that does not have zeroes in the spatial frequency response.

Further modifications will also occur to those skilled in the art, and such are considered to fall within the spirit and scope of the invention as defined in the appended claims.

I claim:

1. In an induction logging system having a first transmitter-receiver array characterized by a first spatial frequency response having no zeroes and a second transmitter-receiver array characterized by a second frequency response having a first zero frequency, a method for enhancing the vertical resolution of said second transmitter-receiver array in determining a characteristic of a formation traversed by a borehole comprising the steps of, determining a first enhanced spatial frequency response from said first spatial frequency response, determining from said second spatial frequency response a second enhanced spatial frequency response which terminates at a frequency below said first zero frequency of said second spatial frequency response, creating a differential spatial frequency response by subtracting said second enhanced spatial frequency response from said first enhanced spatial frequency response, inverting said differential spatial frequency response to produce differential resolution filter weights, inverting said second enhanced spatial frequency response to produce a set of second filter weights, recording first induction logging measurements as a function of depth in the borehole from said first transmitter-receiver array, recording second induction logging measurements as a function of depth in the borehole from said second transmitter-receiver array, filtering said first induction logging measurements with said differential vertical resolution filter weights to produce a differential induction signal, filtering said second induction logging measurements with said second filter weights to produce a second induction signal, and adding said differential induction signal and said second induction signal to produce a signal characteristic of said formation traversed by said borehole.

2. The method of claim 1 in which at least a portion of an induction logging measurement is amplified.

3. The method of claim 1 in which at least a portion of an induction logging measurement is filtered to correct for skin defect.

4. The method of claim 1 in which at least a portion of an induction logging measurement is filtered to correct for shoulder effect.

5. The method of claim 1 in which said signal characteristic of said formation traversed by said borehole corresponds to a preselected depth of interest.

6. The method of claim 1 in which one of the induction logging measurements correspond to the preselected depth of interest.

7. The method of claim 6 in which the said second induction logging measurements correspond to the preselected depth of interest.

8. The method of claim 1 in which the said received first induction logging measurements correspond to a depthof investigation less than the said received first induction signal.

9. An induction logging apparatus for determining a characteristic of a formation traversed by a borehole comprising:

a first transmitter-receiver array characterized by a first spatial frequency response having no zeros;

a second transmitter-receiver array characterized by a second freqeuncy response having a first zero frequency;

means for determining a first enhanced spatial frequency response from said first spatial frequency response;

means for determining from said second spatial frequency response a second enhanced spatial frequency response which terminates at a frequency below said first zero frequency of said second spatial frequency response;

processing means for creating a differential spatial frequency response by substracting said second enhanced spatial frequency response from said first enhanced spatial frequency response;

processing means for inverting said differential spatial frequency response to produce differential resolution filter weights;

processing means for inverting said second enhanced spatial frequency response to produce a set of second filter weights;

recording means for recording first induction logging measurements as a function of depth in the borehole from said first transitter-receiver array;

recording means for recording second induction logging measurements as a function of depth in the borehole from said second transmitter-receiver array;

said filter means for filtering said first induction logging measurements with said differential vertical resolution filter weights to produce a differential induction signal;

second filter means for filtering said second induction logging measurements with said second filter weights to produce a second induction signal; and summing means for adding said differential induction signal and said second induction signal to produce a signal characteristic of said formation traversed by said borehole.

10. The induction logging apparatus of claim 9 including amplifier means for amplifying a portion of a logging measurement.

11. The induction logging apparatus of claim 9 including correction filter means for filtering a portion of a logging measurement to correct for skin effect.

12. The induction logging apparatus of claim 9 including correction filter means for filtering a portion of a logging measurement to correct for shoulder effect.

13. The induction logging apparatus of claim 9 in which the first transmitter-receiver array is preselected to correspond to a desired depth of interest.

14. A method for enhancing resolution for an induction logging tool for use in measuring the characteristic of an earth formation in a borehole, comprising:
   transmitting an induction signal into the formation;
   receiving at a first receiver a first induction signal from the formation corresponding to the desired depth of investigation of the formation;
   receiving at a second receiver a second induction signal from the formation, the second induction signal having no zeroes in the spatial frequency response; and
   combining a portion of the second induction signal with the first induction signal to provide a high resolution measurement of a characteristic of the earth formation at the desired depth of investigation.

15. The method of claim 14 in which the first received induction signal has a zero or negative spatial frequency response over a portion of the frequency domain of interest.

16. The method of claim 15 in which, for the frequencies where the first received signal have a zero or negative spatial frequency response, the second induction signal replaces the first induction signal.

17. The method of claim 16 in which the radial response of the said second received signal is filtered to have a zero radial response.

18. The method of claim 14 in which the first received induction signal corresponds to a deeper depth of measurement than the second received induction signal.

19. The method of claim 14 in which the first and second received induction signals are filtered to produce matched vertical resolution prior to combining the filtered signals.

20. A method for enhancing the resolution of an induction logging tool using phasor processing for use in measuring a characteristic of an earth formation in a borehole, comprising:
   transmitting an induction signal into the formation;
   receiving a first induction signal from the formation corresponding to the desired depth of investigation, the first signal having a zero or negative spatial frequency response over a portion of the frequency domain of interest;
   receiving a second induction signal from the formation, the second induction signal having no zeroes in the spatial frequency response over the frequency domain of interest; and
   combining the second induction signal with the first induction signal over the frequency range where the first induction signal has a zero or negative spatial frequency response to provide a resultant measurement of a characteristic of the earth formation.

21. The method of claim 20 in which the first and second received induction signals are combined such that the resultant measurement measures a characteristic at the desired depth of investigation.

22. The method of claim 21 in which the first received induction signal is filtered to produce a radial response of zero prior to combining with the said second received induction signals.

23. The method of claim 20 in which the portion of the second received induction signal replaces the portion of the first received induction signal over the frequency range where the said first signal has a zero or negative spatial frequency response.

* * * * *